Nov. 29, 1927. 1,650,879
M. SCHÄFER ET AL
MAGNETO ELECTRIC AND THE LIKE MACHINE
Filed Aug. 26, 1921
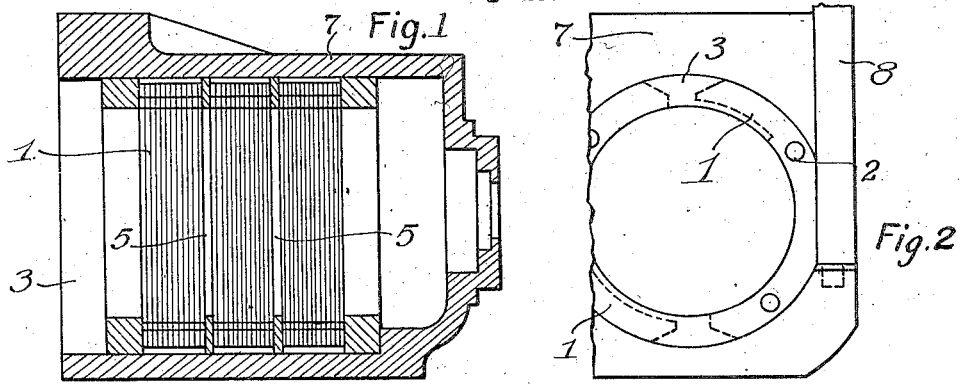
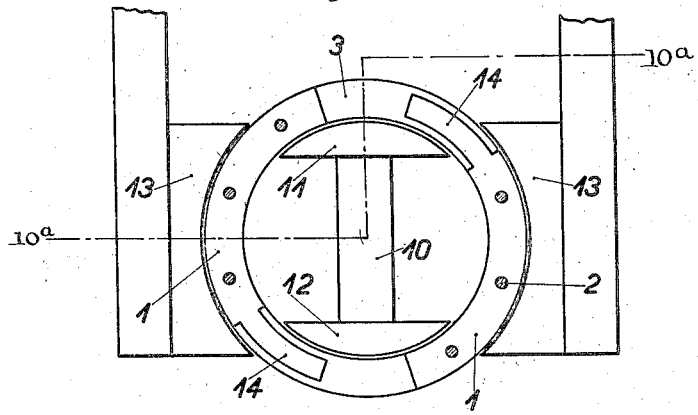
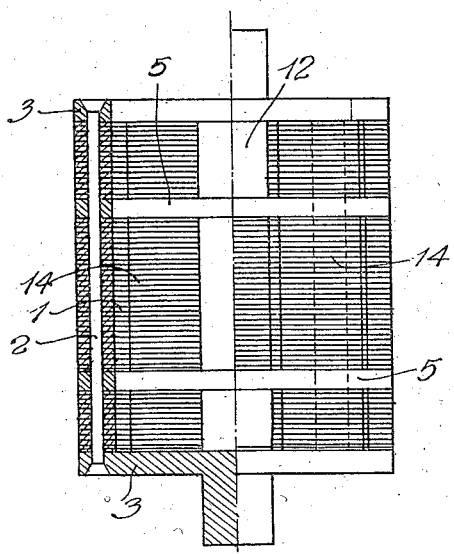
Inventors
Max Schäfer
Walter Häkule
Wilhelm Walther
by R. F. Steward
their attorney Patented Nov. 29, 1927.

1,650,879

UNITED STATES PATENT OFFICE.

MAX SCHÄFER, WALTER HÄHNLE, AND WILHELM WALTHER, OF STUTTGART, GERMANY, ASSIGNORS TO ROBERT BOSCH AKTIENGESELLSCHAFT, OF STUTTGART, GERMANY.

MAGNETO-ELECTRIC AND THE LIKE MACHINE.

Application filed August 26, 1921, Serial No. 495,524, and in Germany April 22, 1920.

Sleeves of magnetic material have been used as guide pieces for the magnetic flux lines of magneto-electric machines, and such sleeves have been inserted between the armature and the pole shoes. These sleeves may be arranged so as to be fixed or revoluble and displaceable. It has been found difficult in practise to use such sleeves of laminated iron because the sleeves thus made had not the necessary strength, especially when the guide pieces had large cut away parts.

According to this invention the sleeve is made of laminated segments of iron with strengthening rings inserted between them, which preferably are made of non-magnetic material. The construction of the sleeve or bush of laminated iron is particularly advantageous at the place which faces the armature core or winding. An arrangement of strengthening rings will consequently be adopted so none lie at this place.

It is also well known in magneto-electrical machines to combine the field pole shoes into a pole ring in the form of a sleeve and to insert this as a whole in the machine casing.

According to the present invention a pole shoe ring having unsymmetrical pole sides is arranged as a detachable unit reversible end for end.

In this way the advantage is obtained that in spite of the unsymmetry of the pole shoes, it is possible, with the same machine casing to use the same pole ring with unsymmetrically arranged pole shoes for a magneto for either direction of rotation, that is to say either clockwise or anti-clockwise.

The pole ring can, for example, be assembled from segmental pole shoes held in a sleeve like body by connecting pieces of closed form.

Where it is desirable that the pole ring should not contact over its entire length with the casing the arrangement may be adopted of providing the casing with a separate short guide flange for engaging the pole ring. In the case of long pole rings, particularly those of laminated iron, it is under certain circumstances of advantage to arrange a plurality of connecting pieces in order to obtain the necessary strength.

In order to make our invention more clear we refer to the accompanying drawings, in which Fig. 1 is a longitudinal section of the casing of a magneto-electric ignition apparatus constructed according to this invention.

Fig. 2 is a fragmentary end view of the construction shown in Fig. 1;

Fig. 3 is an end view of a slightly different form of construction; and

Fig. 4 is a plan view, partly in section, along the line 10a—10a of Fig. 3, omitting the pole pieces of the magnet.

In the form of construction illustrated, the segments 1 are inserted between strengthening rings 3 held together by bolts 2. A sleeve is thereby formed which sleeve may be used as a fixed sleeve or as a rotary sleeve for magneto-electric machines. The strengthening rings 3 give the sleeve sufficient strength to prevent distortion of its form by the bending of the bolts 2 when under strain.

When sleeves of a greater length are desired other strengthening rings 5 are provided in addition to the end rings 3, which rings 5 are distributed over the length of the sleeve as shown. To obtain an unimpeded flux path for the lines of force it is preferable to make the distance between the inner strengthening rings at least as large as the width of the armature winding. In the case of these long sleeves particularly in their use as rotary sleeves it will be seen that the strengthening rings prevent distortion which would otherwise result at high speeds of rotation due to the action of centrifugal force and which would give rise to damage.

The form of the strengthening rings is of itself immaterial, but will be according to the form of the casing in which the sleeve is to be inserted and according to the purpose of the sleeve. The rings are made of non-magnetic material, such as brass or the like, but their use when made of magnetic material is allowable in cases in which short circuiting between the poles is immaterial or is even desirable.

The bush may also be employed as a pole ring to be inserted in a one piece casing, as shown particularly in Fig. 1. When the pole shoes have unsymmetrical extensions, as shown in Fig. 2, the advantage is obtained that by turning the sleeve through 180° at right angles to its centre line a magneto may be assembled for either direction of rotation as desired.

In the construction shown in Figs. 1 and 2, the pole ring consists of the unsymmetrical pole shoes 1, which consist of segments and are combined into a sleeve like body by means of end pieces 3. This can be inserted in the casing 7, consisting for example, of one piece, either as shown or reversed end for end, that is to say, turned through 180° about an axis at right angles to its longitudinal axis. In this latter case the machine will immediately be adapted for the reverse direction of rotation. Of course care must always be taken that the pole shoes 1 are in contact with the sides 8 of the permanent magnetic system. The external shape of the pole ring may be any desired one, and corresponds to the bore of the casing. When it is made circular, means are adopted for preventing the inserted sleeve from turning. For this separate set screws may be provided, or the ring can be provided with a flat at the sides, the bore of the casing (Fig. 7) being correspondingly shaped. The pole ring may also be cast in the casing, wedged therein or riveted to it if it is not necessary to again separate the casing and pole ring after assembling.

In the case of pole rings of greater length, in addition to the connecting pieces 3 mounted at the ends, further connecting rings or the like 5 may be provided, as shown. It is preferable to make the distance between the two inner-most of these rings at least equal to the axial length of the armature core, that is to say, transverse of the armature winding in order not to impede the passage of the lines of force. The connecting pieces are, in order to avoid short circuiting at the two poles, made of non-magnetic material, but the pole shoes with the connecting parts may also be made of similar material and in one piece if short circuiting is negligible, or even for certain reasons is somewhat desirable.

The connecting pieces 5 also serve for giving the sleeve internal strength which is particularly necessary when the pole shoes are made of laminated iron.

Concerning the form of construction shown in Figs. 3 and 4, there is shown in this example an ignition apparatus with a double T-armature and the rotary sleeve is stepped parallely to the axis of rotation. The rotary sleeve is arranged about the armature 10 which is provided with the shoes 11 and 12. The segments of the sleeve have overlappings 14 which are stepped at the inner side, as well as at the outer one, whereby the retarded ignition is improved at the break of the lines of force at the armature, as well as at the magnet pole shoes.

If for any reason the armature shoes are provided with overlappings, the corresponding overlapping at the rotary sleeve may be dispensed with so that in such a case the sleeve segments are stepped only at one side.

In the form of construction shown in Figs. 3 and 4, the end rings 3 and the intermediate rings 5, hereinbefore referred to, are employed.

Having now described the nature of our invention, what we claim as new and desire to secure by Letters Patent of the United States is:

1. In a magneto-electric ignition machine, the combination, with a plurality of segments of laminated iron having stepped extensions, of rings arranged co-axially with said segments and forming with them a sleeve having apertures in its circumference and being adapted to serve as conductor for the lines of force of the magneto-electric machine.

2. In a magneto-electric ignition machine, the combination, with a plurality of segments of laminated iron having extensions stepped from the inner and the outer sides of the segments, of rings arranged co-axially with said segments and forming with them a sleeve having apertures in its circumference and being adapted to serve as conductor for the lines of force of the magneto-electric machine.

3. A sleeve-like body adapted to serve as a conductor for the flux lines in a magneto electric machine, comprising, in combination, a plurality of segments of stepped laminated iron in circumferentially spaced relation about a common axis, end and intermediate reinforcing rings of non-magnetic material arranged coaxially with said segments, and means to secure said segments and rings together.

4. In a magneto-electric machine, the combination, with the armature and magnetic pole shoes of said machine, of a sleeve-like body adapted to be inserted between said pole shoes and armature, such armature being formed of stepped segments of laminated iron arranged about a common axis, reinforcing rings arranged coaxially with said segments, and means securing said segments and rings together.

In testimony whereof we have affixed our signatures.

MAX SCHÄFER.
WALTER HÄHNLE.
WILHELM WALTHER.